Patented Feb. 11, 1941

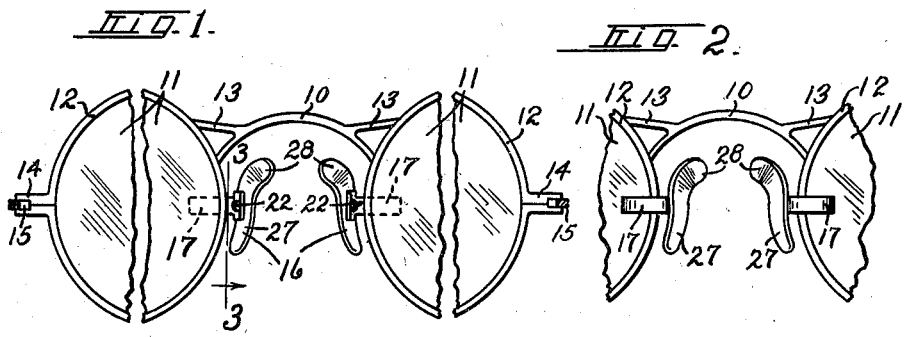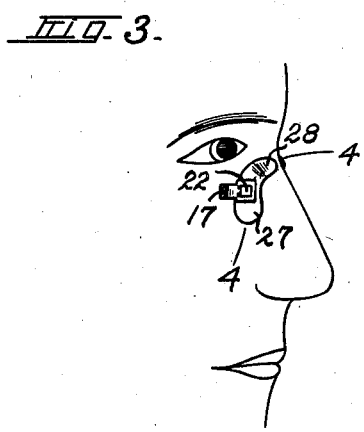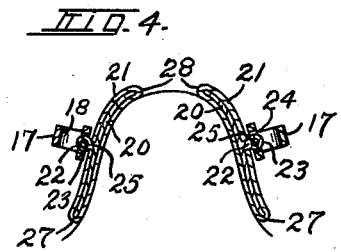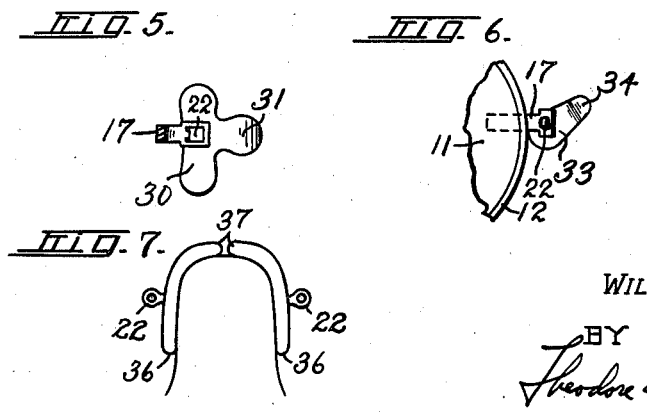

2,231,413

UNITED STATES PATENT OFFICE 2,231,413

NOSE PAD FOR EYEGLASS MOUNTINGS

William E. McDonell, Rochester, and George Herbert Ford, Geneva, N. Y., assignors to Shuron Optical Company, Inc., Geneva, N. Y., a corporation of New York Application August 4, 1938, Serial No. 223,050

2 Claims. (Cl. 88—48)

This invention relates to improvements in a mounting for eyeglasses wherein a pair of nose pads or guards and a pair of bows or temples associated with the lenses are adapted to cooperate with each other for maintaining the lenses in proper operative relation with the eyes.

In lens mountings of the above mentioned character, the nose pads, as usually constructed herebefore, have engaged the side portions of the nose only when the lenses are held in the operative position. This has resulted in the pads becoming more or less embedded in the nose after continued use, particularly when the nose is more or less wedge-shaped and, in cases where the user has a sensitive nose, often produced irritation. Furthermore, in the cases of young children whose noses are soft and not fully formed, it is sometimes difficult to find a place at the sides of the nose for the nose pads to properly rest or seat so as to hold the lenses in correct relation with the eyes.

The primary object of this invention is to provide an improved nose pad for eyeglass mountings or frames which is particularly adapted to fit the nose so as to give greater support and distribute the pressure more advantageously throughout a greater area.

A more specific object of the invention resides in providing a nose pad which not only engages a side portion of the nose but also extends over the top portion of the nose so as to rest to a certain extent on the bridge of the nose and thereby support the lenses against downward movement without depending entirely upon pressure engagement of the pads with the side portions of the nose.

Another object of the invention is to produce a nose pad which will coincide mechanically with the contour of the nose and apply some weight on the apex portion of the nose which is practically devoid of blood vessels and is most able to sustain the pads, and which will neither interfere with the capillary circulation on the bridge of the nose nor constrict the main nasal vessels or lymphatics, where the nose meets the cheeks.

When eyeglasses having the conventionally constructed nose pads or guards are fitted on straight side noses, where the side portions of the nose are substantially parallel, the nose pads have been fitted in more or less parallel relation to each other so that they easily slide longitudinally of the nose with the result that the lenses are maintained too close to the eyes by the tension of the temples.

A further object is to produce a nose pad which, when fitted to noses of the straight side type, will hold the frames and mountings permanently in the proper place both horizontally and vertically, and prevent inward movement thereof by the tension of the temples.

I obtain these objects by the construction illustrated in the accompanying drawing, in which:

Figure 1 is an outer or front view of a pair of eyeglasses showing a preferred embodiment of this invention, portions of the lenses and frame being broken away and the temple bars being shown broken away and in section.

Figure 2 is a detail inner or rear face view of the intermediate portion of the lens structure shown in Figure 1.

Figure 3 is a side elevation as viewed from line 3—3, Figure 1, showing a nose pad of this invention in operative position on a nose, the attachment arm of the nose pad being shown in section.

Figure 4 is a detail transverse sectional view taken substantially on line 4—4, Figure 3, through the nose pads, said pads being illustrated diagrammatically in operative relation with the sides and bridge portion of the nose.

Figures 5 and 6 are detail face views illustrating respective modified forms of the nose pad illustrated in Figures 1 to 4.

Figure 7 is a view similar to Figure 4 illustrating the nose pads applied to a nose of the straight side type.

In the structure shown in Figures 1 to 4 inclusive of the drawing to illustrate my invention, the numeral 10 represents the bridge and 11 represents the lenses of the eyeglasses. The lenses 11 are shown mounted in frames 12 which are connected to the shanks 13 of the bridge 10 as by solder or by other suitable means. The frames 12 are provided with the usual mounting straps 14 to which are pivotally connected in any well known manner the forward ends of the temple bars 15.

The nose pads or guards 16, which comprise the novel features of this invention, may be connected with the inner adjacent portion of the frames 12 by arms 17. These arms are preferably composed of pliable material and are shown provided with a loop 18 intermediate the ends thereof whereby the arms may be readily adjusted to bring the pads 16 into the most advantageous engagement with the nose for supporting the lenses. The bridge 10 is of the type commonly known as a pad bridge which is designed to extend across the bridge of the nose in spaced relation thereto for holding the lenses in fixed spaced relation to each other but not to come into contact with the nose for supporting the frame or mounting against downward movement. The pad 16 may be constructed in various ways and preferably includes a relatively stiff plate insert 20 composed of metal and which is encased in a suitable covering 21 usually composed of non-metallic material such as Celluloid or zylonite. The plate 20 is provided with a lug 22 disposed substantially centrally thereof and which projects outwardly through the covering 21 and is provided with an apertured head 23.

Each arm 17 has one end thereof secured in the conventional manner, as by solder, to the inner adjacent side of the corresponding frame 12. The other or free end of each arm 17 is provided with a substantially rectangular aperture 24 adapted to receive the head 23 of the lug 22 therein. Each arm 17 is provided with a retaining pin 25 which is adapted to extend across the aperture 24 and into the opening in the lug head 23 for pivotally connecting the arm and nose pad to each other.

Each pad 16, shown in Figures 1 to 4, inclusive, comprises two end portions 27 and 28 arranged at opposite sides of the lug 22. These end portions are preferably relatively broad flat members, the lower end portion, as 27, being slightly curved outwardly to conform to the tapered or wedge-shaped side portion of the nose. The upper end portion 28 of the pad is gradually curved in the opposite direction or inwardly so as to extend from the intermediate portion of the pad over the bridge portion of the nose into engagement with at least a portion thereof so as to be supported against downward movement by said bridge portion of the nose.

Although the upper portion 28 of the nose pads may be constructed so as to substantially meet when in engagement with the nose, as illustrated in Figure 7 of the drawing, it is preferable that these upper portions be slightly spaced from each other so as to provide a structure which will afford a pleasing appearance and at the same time allow for maximum adjustment of the pads with respect to each other to bring them into conformity with various types and forms of noses.

The upper portions 28 of each pad, as shown more particularly in Figure 3, is also curved forwardly with respect to the lower portion 27 so that when the eyeglasses are fitted to a person these upper portions of the pads will engage the nose just forwardly of the canthus. In other words, the lower portions of the pads most advantageously engage the side portions of the nose while the upper end portions of the pads rest gently upon the adjacent bridge portion of the nose and limit the downward movement of the lens mounting or frame with respect to the nose. It, therefore, follows that the lower portions of the pads will be maintained against excessive downward movement along these side portions of the nose which are usually more or less wedge-shaped, due to the upper portions of the pads resting upon the bridge portion of the nose. This prevents the excessive indentation of the pads in the nose which often occurs when the weight of the mounting and lenses is fully supported by the engagement of the pads with only the side portions of the nose.

Furthermore, it will be observed that the engagement of the pads or guards 16 with the side and bridge portions of the nose prevents the spectacle frame from sliding or being pulled inwardly toward the canthus of the patient's eyes by the action of the temples, particularly on a certain type of nose such as that of a child where the nose is not fully developed, or on a nose having substantially straight parallel sides as illustrated in Figure 7 of the drawing.

In Figures 5 and 6, there are shown two forms of nose pads which function in substantially the same manner as the nose pads or guards shown in the remaining figures of the drawing but which illustrate further shapes of the pads which may be employed.

In the structure shown in Figure 5, the nose pad is shown provided with a substantially vertically disposed body portion 30 and a laterally disposed portion 31. The attachment arm 17 is shown connected with the nose pad substantially midway between the ends of the body portion 30 while the laterally disposed portion 31 projects from one side of the body portion 30 opposite the arm 17. The body portion 30 of the pad may have the inner side surface thereof opposite the arm 17 slightly curved laterally so as to conform with the general contour of the side of the nose. The lateral portion 31 of the pad is slightly curved longitudinally thereof from the body portion away from the arm 17 so that when the body portion of the pad is in engagement with the adjacent side portion of the nose the portion 31 of the nose pad will extend over the adjacent portion of the bridge of the nose and rest upon said latter portion for maintaining the lenses against downward movement with respect to the nose and eyes.

In the structure shown in Figure 6, the attachment arm 17 is illustrated as being connected with the nose pad 33 in slightly spaced relation to the lower edge of one end thereof. The pad extends upwardly and outwardly from the attachment arm at an angle thereto and has the outer end portion 34 slightly curved in a direction away from the attachment arm. When this pad is in operative relation with the nose the base portion 33 rests against the adjacent side portion of the nose while the upper extension 34 of the pad extends over and rests upon the adjacent portion of the bridge of the nose.

The nose pads illustrated in Figure 7 may be of any suitable form in general outline. Each of these pads has a substantially straight lower end portion 36 adapted to engage the substantially straight side portion of the nose and a curved upper end portion 37 adapted to extend over the apex or bridge portion of the nose to substantially the longitudinal center thereof.

It will thus be seen that in the structures shown in Figures 5, 6 and 7, the lenses will be maintained against downward movement with respect to the eyes by the engagement of the nose pads with the side and bridge portions of the nose while the bridge of the lens mounting will be maintained in greater or less spaced relation to the nose, depending upon the structure of the bridge.

Although the construction and form of the nose pads illustrated in the drawing are particularly simple, practical and efficient, we do not wish to be limited to the details thereof shown, as it is evident that various changes may be made in the detail construction and form of the nose pad without departing from the spirit of the invention as set forth in the appended claims.

We claim:

1. In an eyeglass structure of the class described, a pair of nose pads, fixed attachment means pivotally engaging intermediate portions of the nose pads supporting said pads in opposed cooperative relation and to freely rock toward and from and independently of each other, said nose pads having portions of the inner surfaces thereof slightly curved downwardly and outwardly from adjacent the attachment means away from each other for engagement with corresponding side portions of the nose, and additional portions of the inner surfaces of said nose pads being curved upwardly, forwardly and inwardly from the attachment means toward each other so as to extend over and rest upon corresponding portions of the bridge of the nose.

2. In an ophthalmic mounting having a lens supporting bridge arranged to be maintained in spaced relation to the nose of the wearer, a pair of nose pads pivotally mounted in spaced relation to said bridge, said nose pads each comprising a continuous member having a downwardly and outwardly extending portion and an upwardly and inwardly extending portion, said nose pads cooperating to form in effect a nose engaging bridge that is automatically self-adjusting to accommodate itself to the nose of the wearer while distributing the weight of the eye glasses over the bridge of the nose and along the sides of the nose, and maintaining the lens supporting bridge substantially in fixed spaced relationship to the nose of the wearer when said pads are in the adjusted position.

WILLIAM E. McDONELL.
GEORGE HERBERT FORD.